(12) United States Patent
Wang et al.

(10) Patent No.: US 9,804,403 B2
(45) Date of Patent: Oct. 31, 2017

(54) MOIRE REDUCING OPTICAL SUBSTRATES WITH IRREGULAR PRISM STRUCTURES

(71) Applicant: UBRIGHT OPTRONICS CORPORATION, Taoyuan County (TW)

(72) Inventors: Kong-Hua Wang, Taoyuan County (TW); Craig Lin, Taoyuan County (TW); Daniel Yaw-Chung Ko, Taoyuan County (TW)

(73) Assignee: UBright Optronics Corporation, Taoyuan (TW)

(*) Notice: Subject to any disclaimer, the term of this patent is extended or adjusted under 35 U.S.C. 154(b) by 99 days.

(21) Appl. No.: 15/099,618

(22) Filed: Apr. 15, 2016

(65) Prior Publication Data

US 2016/0231498 A1 Aug. 11, 2016

Related U.S. Application Data

(63) Continuation of application No. 14/825,170, filed on Aug. 13, 2015, now Pat. No. 9,400,392, which is a
(Continued)

(51) Int. Cl.
*F21V 8/00* (2006.01)
*F21V 5/04* (2006.01)
(Continued)

(52) U.S. Cl.
CPC ............ *G02B 27/126* (2013.01); *F21V 5/005* (2013.01); *G02B 5/0221* (2013.01); *G02B 5/045* (2013.01);
(Continued)

(58) Field of Classification Search
CPC .............. G02B 27/126; G02B 27/1073; G02B 5/0221; G02B 5/045; G02B 6/0053;
(Continued)

(56) References Cited

U.S. PATENT DOCUMENTS 5,779,337 A * 7/1998 Saito .................... G02B 6/0038
362/23.15
5,919,551 A * 7/1999 Cobb, Jr. ................. G02B 5/00
359/530

(Continued)

FOREIGN PATENT DOCUMENTS

WO   WO 2005/003851 A1   1/2005

*Primary Examiner* — Alan Cariaso
(74) *Attorney, Agent, or Firm* — Min-Lee Teng; Litron Patent & Trademark Office

(57) ABSTRACT

An optical substrate has a structured surface that enhances brightness and reduces moire effect. The optical substrate has a three-dimensionally varying, structured light output surface that comprises an irregular prismatic structure. The irregular prismatic structure may be viewed as comprising longitudinal prism blocks or rows thereof, arranged laterally defining peaks and valleys. Adjacent peaks, adjacent valleys, and/or adjacent peak and valley may be parallel or non-parallel, in an orderly, semi-orderly, random, or quasi-random manner. The lateral adjacent peaks, adjacent valleys, and/or adjacent peak and valley are not parallel. The adjacent irregular prism blocks may be irregular longitudinal sections having the same length, or random or quasi-random irregular sections having different lengths. The facets of each prism block may be flat, or curved (convexly and/or concavely).

20 Claims, 17 Drawing Sheets

Related U.S. Application Data continuation of application No. 14/010,478, filed on Aug. 26, 2013, now Pat. No. 9,448,411, which is a continuation of application No. 12/590,855, filed on Nov. 12, 2009, now Pat. No. 8,517,573, which is a continuation of application No. 11/450,145, filed on Jun. 9, 2006, now Pat. No. 7,618,164.

(60) Provisional application No. 60/689,650, filed on Jun. 9, 2005.

(51) Int. Cl.
*G02B 27/12* (2006.01)
*F21V 5/00* (2015.01)
*G02B 5/02* (2006.01)
*G02B 5/04* (2006.01)
*G02B 27/10* (2006.01)
*G02F 1/1335* (2006.01)

(52) U.S. Cl.
CPC ......... G02B 6/0053 (2013.01); G02B 6/0061 (2013.01); G02B 27/1073 (2013.01); G02F 1/133504 (2013.01); G02F 1/133606 (2013.01); G02F 2001/133507 (2013.01)

(58) Field of Classification Search
CPC .................. G02B 6/0061; F21V 5/005; G02F 1/133504; G02F 1/133606; G02F 2001/133507
See application file for complete search history.

(56) References Cited

U.S. PATENT DOCUMENTS

| | | | | |
|---|---|---|---|---|
| 6,354,709 | B1* | 3/2002 | Campbell | G02B 5/045 359/837 |
| 7,384,173 | B2* | 6/2008 | Whitney | G02B 5/045 349/65 |
| 2003/0103760 | A1* | 6/2003 | Gardiner | G02B 6/0038 385/146 |
| 2004/0105157 | A1* | 6/2004 | Matsushita | G02B 5/021 359/584 |
| 2005/0001043 | A1* | 1/2005 | Gardiner | G02B 6/0038 235/494 |
| 2005/0122591 | A1* | 6/2005 | Parker | F21V 5/00 359/619 |
| 2005/0141243 | A1* | 6/2005 | Mullen | B29C 35/0894 362/600 |
| 2005/0280752 | A1* | 12/2005 | Kim | G02B 5/0221 349/62 |

* cited by examiner

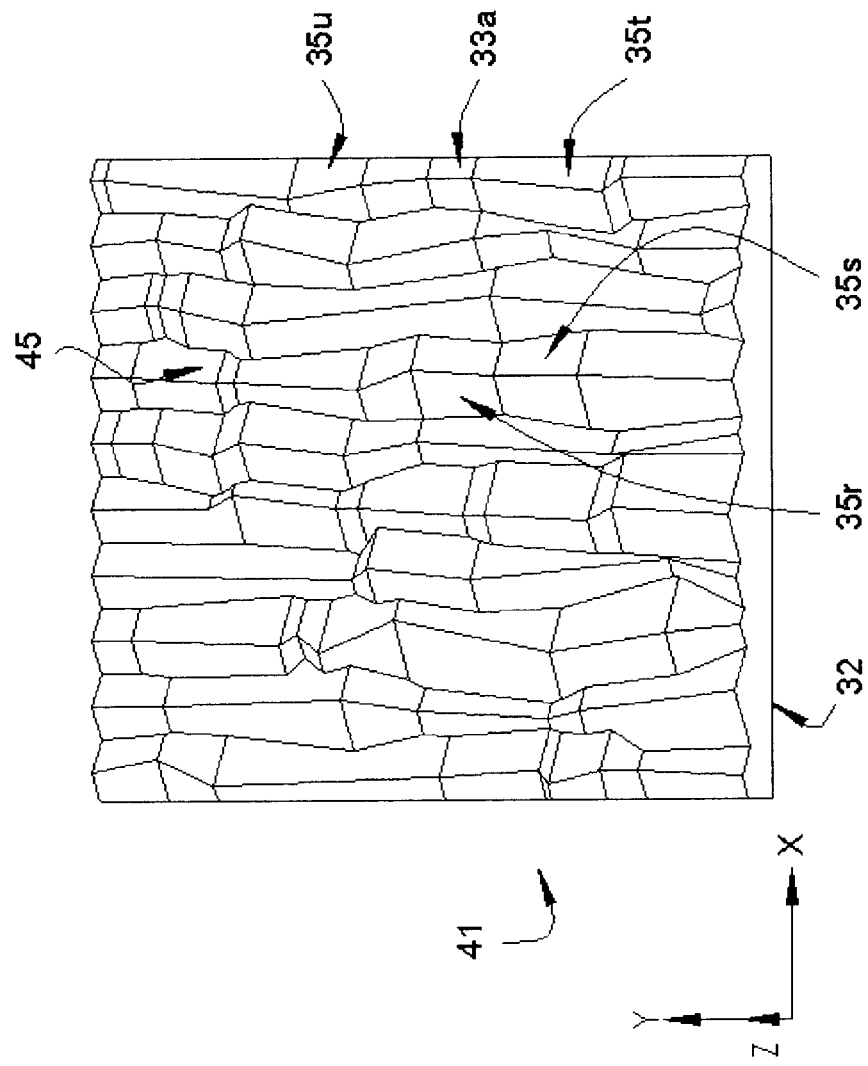

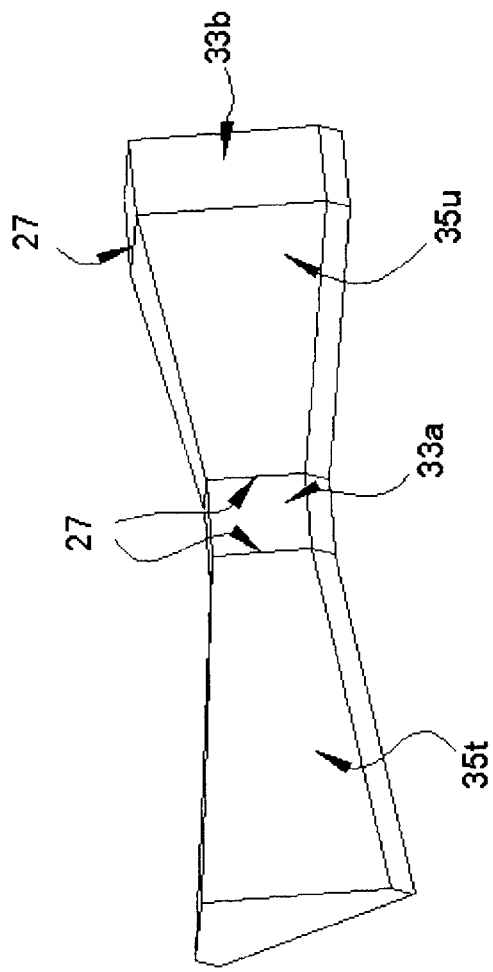

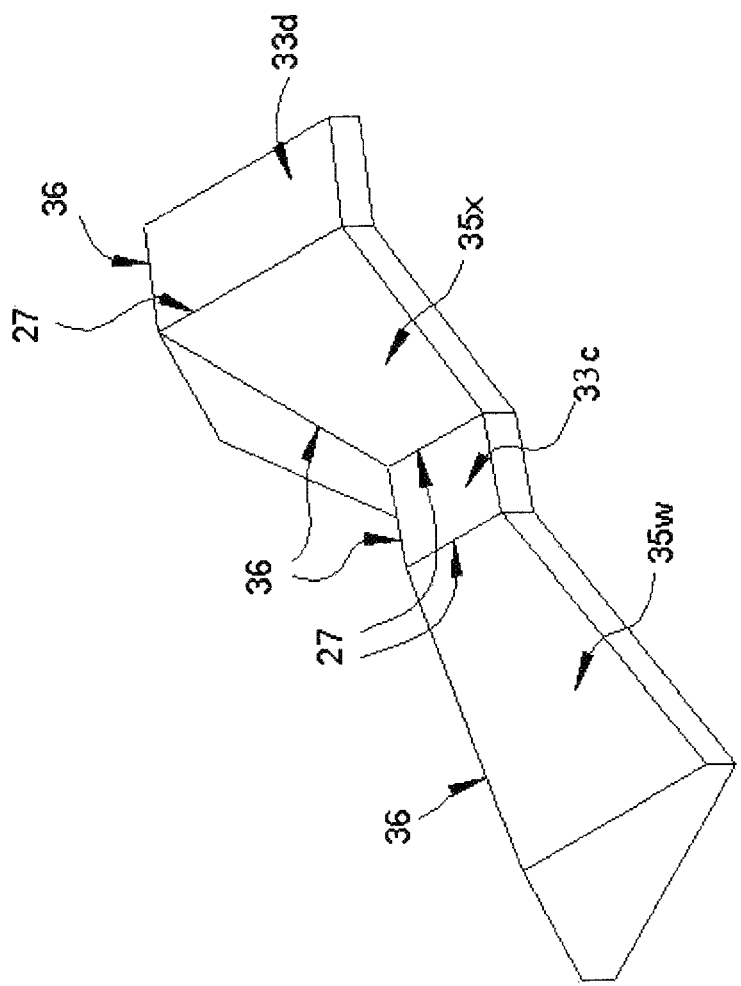

MOIRE REDUCING OPTICAL SUBSTRATES WITH IRREGULAR PRISM STRUCTURES

CROSS-REFERENCE TO RELATED APPLICATIONS

This application is a continuation of U.S. patent application Ser. No. 14/825,170 filed on Aug. 13 2015, which is a continuation of U.S. patent application Ser. No. 14/010,478 filed on Aug. 26, 2013, which is a continuation of U.S. patent application Ser. No. 12/590,855 filed on Nov. 12, 2009, now U.S. Pat. No. 8,517,573, which is a continuation of U.S. patent application Ser. No. 11/450,145 filed on Jun. 9, 2006, now U.S. Pat. No. 7,618,164, which claims priority of U.S. provisional application Ser. No. 60/689,650 filed on Jun. 9, 2005. All of these applications are incorporated by referenced herein in their entirety.

BACKGROUND OF THE INVENTION

1. Field of the Invention

The present invention relates to optical substrates having a structured surface, particularly to optical substrates for brightness enhancement, and more particularly to brightness enhancement substrates for use in flat panel displays having a planar light source.

2. Description of Related Art

Flat panel display technology is commonly used in television displays, computer displays, and handheld electronics (e.g., cellular phones, personal digital assistants (PDAs), etc.). Liquid crystal display (LCD) is a type of flat panel display, which deploys a liquid crystal (LC) module having an array of pixels to render an image. In backlight LCDs, brightness enhancement films use prismatic structures to direct light along the viewing axes (i.e., normal to the display), which enhances the brightness of the light viewed by the user of the display and which allows the system to use less power to create a desired level of on-axis illumination.

Heretofore, brightness enhancement films were provided with parallel prismatic grooves, lenticular grooves, or pyramids on the light emitting surface of the films, which change the angle of the film/air interface for light rays exiting the films and cause light incident obliquely at the other surface of the films to be redistributed in a direction more normal to the exit surface of the films. The brightness enhancement films have a light input surface that is smooth, through which light enters from the backlight module. Heretofore, many applications used two brightness enhancement film layers rotated relative to each other such that the grooves in the respective film layers are at 90 degrees relative to each other.

An undesirable effect arising from using two brightness enhancement films in a flat panel display is the appearance of moire patterns caused by the interference of the two periodic patterns of the prismatic structures on the surfaces of the two brightness enhancement films. In the past, brightness enhancement films have been developed with various surface structural configurations in an attempt to avoid moire pattern formation. In a flat panel display that incorporates a single layer of brightness enhancement film, the periodic patterns causing moiré are the patterns of the prismatic structure on the film itself and the reflected image of such patterns (as reflected by other surfaces in the flat panel display). Further, the structures on the brightness enhancement film and the pixel array in the LC module could create moiré patterns as well.

For example, U.S. Pat. No. 5,280,371 discloses the use of different spatial frequencies or pitches of parallel for the two layers of brightness enhancement films. Further, it discloses rotating at least one of the brightness enhancement films with respect to the pixel array in the LC module such that the longitudinal structures on the film is at an angle to the pixel array to reduce moire effect. However, due to conventional manufacturing processes for brightness enhancement films, significant trimming is required to obtain a rectangular shaped brightness enhancement film for use with a rectangular flat panel display, such that the prismatic structures are rotated at an angle relative to the pixel array in the LC module. This significantly increases costs of production.

U.S. Pat. No. 5,919,551 discloses a structured optical film with parallel, variable pitch peaks and/or grooves to reduce the visibility of moire interference patterns and optical displays incorporating one or more layers of the film. The pitch variations can be over groups of adjacent peaks and/or valleys or between adjacent pairs of peaks and/or valleys. The cross sectional views across the optical film remain constant along the peaks and valley direction.

U.S. Pat. No. 6,862,141 discloses an optical substrate that features a three-dimensional surface having a correlation length of about 1 cm or less. The optical substrate is defined by a first surface structure function modulated by a second surface structure function, the first surface structure function producing at least one specular component from a first input beam of light. The peaks of the three-dimensional structure lie on the same plane. The optical substrate is suitable for use in a variety of applications, including brightness enhancement. This disclosure proposes a rather complicated method to derive the surface structure for the optical substrate. It is unclear from the disclosure how the optical substrate can actually be physically implemented. Further, it is doubtful of the level of brightness enhancement that can be achieved with the disclosed structure, as compared to prism films.

What is needed is a cost effective optical substrate that provides a surface structure that both enhances brightness and reduces moire effect in a single substrate.

SUMMARY OF THE INVENTION

The present invention is directed to an optical substrate that possesses a structured surface that enhances luminance or brightness and reduces moire effect in a single substrate. In one aspect of the present invention, the optical substrate is in the form of a film, sheet, plate, and the like, which may be flexible or rigid, having a three-dimensionally varying, structured light output surface that comprises an irregular prism structure, and a non-structured, smooth, planar, light input surface.

In one embodiment of the present invention, the light output surface and the light input surface are generally parallel to each other in the overall optical substrate structure (i.e., do not form an overall substrate structure that is generally tapered, concave, or convex).

In another embodiment of the present invention, the irregular prism structure at the light output surface may be viewed as comprising longitudinal irregular prism blocks arranged laterally (side-by-side), defining peaks and valleys. A facet of the longitudinal irregular prism block is defined between each adjacent peak and valley. The longitudinally varying prismatic structure has one or more of the following structural characteristics. At least a plurality of the irregular prism blocks have a large end tapering to a small end, or from a large width to a narrow width, or from a large peak height to a small peak height. Adjacent peaks, adjacent valleys, and/or adjacent peak and valley are not parallel within at least a range of lateral prism blocks. The adjacent peaks, adjacent valleys, and/or peak and valley may alternate from parallel to non-parallel in an orderly, semi-orderly, random, or quasi-random manner. Similarly, the non-parallel peaks, valleys and/or peak and valley may alternate between convergence to divergence in reference to a particular longitudinal direction, in an orderly, semi-orderly, random, or pseudo-random manner. All the peaks do not lie in the same plane, and all the valleys may or may not lie in the same plane. The sections taken across the peaks and valleys in the longitudinal direction are not constant. The pitch between adjacent peaks, adjacent valleys, and/or adjacent peak and valley varies laterally across the prism blocks in an orderly, semi-orderly, random, or quasi-random manner.

In another embodiment of the present invention, the irregular prism structure at the light output surface may be viewed as comprising side-by-side or lateral rows of irregular prism blocks, wherein each longitudinal row of irregular prism blocks may be viewed as comprising a plurality of irregular prism blocks connected end to end in a continuous manner. In one embodiment, the smaller end of one prism block is connected to the smaller end of another prism block along the same row, and the larger end of one prism block is connected to the larger end of another prism block along the same row. The lateral adjacent peaks, adjacent valleys, and/or adjacent peak and valley are not parallel. The peak and valley structure across the prism blocks many have further structural characteristics similar to the previous embodiment. The adjacent irregular prism blocks may be irregular longitudinal sections having the same length, or random or quasi-random irregular sections having different lengths.

In a further embodiment of the present invention, the peaks or valleys of adjacent rows of prism blocks may be parallel, and the irregular prism blocks of one row intersect the irregular prism blocks of another row.

In yet another embodiment of the present invention, one or more facets of each prism block sections may be substantially flat, or curved (convexly and/or concavely).

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

FIG. 8 is a top plan view of the structured light output surface in FIG. 7.

FIG. 9A is a schematic perspective view of a plurality of blocks aligned in a row, including a mix of irregular and regular prism blocks, in accordance with one embodiment of the present invention.

FIG. 9B is a schematic perspective view of an alternate embodiment of the row of prism blocks in FIG. 9A, in which the prism blocks are skewed at an angle in plan view, in accordance with another embodiment of the present invention.

DETAILED DESCRIPTION OF THE ILLUSTRATED EMBODIMENTS

The present description is of the best presently contemplated mode of carrying out the invention. This invention has been described herein in reference to various embodiments and drawings. This description is made for the purpose of illustrating the general principles of the invention and should not be taken in a limiting sense. It will be appreciated by those skilled in the art that variations and improvements may be accomplished in view of these teachings without deviating from the scope and spirit of the invention. The scope of the invention is best determined by reference to the appended claims.

The present invention is directed to an optical substrate that possesses a structured surface that enhances brightness and reduces moire effect. In one aspect of the present invention, the optical substrate is in the form of a film, sheet, plate, and the like, which may be flexible or rigid, having a three-dimensionally varying, structured light output surface that comprises an irregular prism structure, and a non-structured, smooth, planar, light input surface. By way of illustration and not limitation, the present invention will be described in connection with an optical substrate for use in an LCD having an LC panel defining a generally rectangular display area in which an image is rendered.

Figure 1:
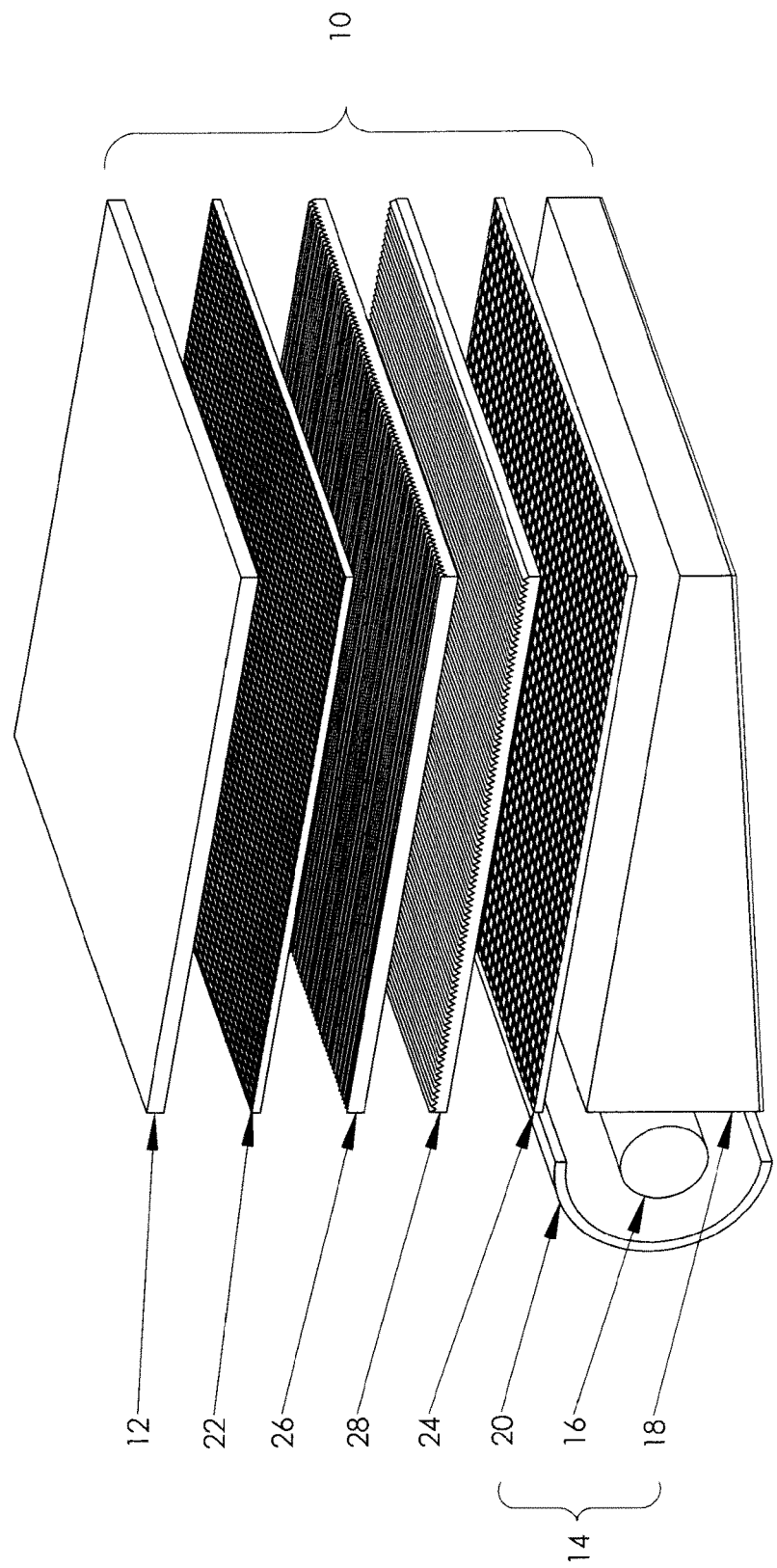
FIG. 1 schematically illustrates the structure of a LCD having an optical substrate, in accordance with one embodiment of the present invention.

FIG. 1 illustrates an example of a flat panel display. A backlight LCD 10, in accordance with one embodiment of the present invention, comprises a liquid crystal (LC) display module 12, a planar light source in the form of a backlight module 14, and a number of optical films interposed between the LC module 12 and the backlight module 14. The LC module 12 comprises liquid crystals sandwiched between two transparent substrates, and control circuitry defining a two-dimensional array of pixels. The backlight module 14 provides planar light distribution, either of the backlit type in which the light source extends over a plane, or of the edge-lit type as shown in FIG. 1, in which a linear light source 16 is provided at an edge of a light guide 18. A reflector 20 is provided to direct light from the linear light source 16 through the edge of the light guide 18 into the light guide 18. The light guide is structured (e.g., with a tapered plate and light reflective and/or scattering surfaces defined on the bottom surface facing away from the LC module 12) to distribute and direct light through the top planar surface facing towards LC module 12. The optical films may include upper and lower diffuser films 22 and 24 that diffuse light from the planar surface of the light guide 18. The optical films further includes upper and lower structured surface, optical substrates 26 and 28 in accordance with the present invention, which redistribute the light passing through such that the distribution of the light exiting the films is directed more along the normal to the surface of the films. The optical substrates 26 and 28 are often referred in the art as luminance or brightness enhancement films, light redirecting films, and directional diffusing films. The light entering the LC module 12 through such a combination of optical films is uniform spatially over the planar area of the LC module 12 and has relatively strong normal light intensity. The optical substrates in accordance with the present invention may be used with LCDs to be deployed for displays, for example, for televisions, notebook computers, monitors, portable devices such as cell phones, PDAs and the like, to make the displays brighter.

Figure 2:
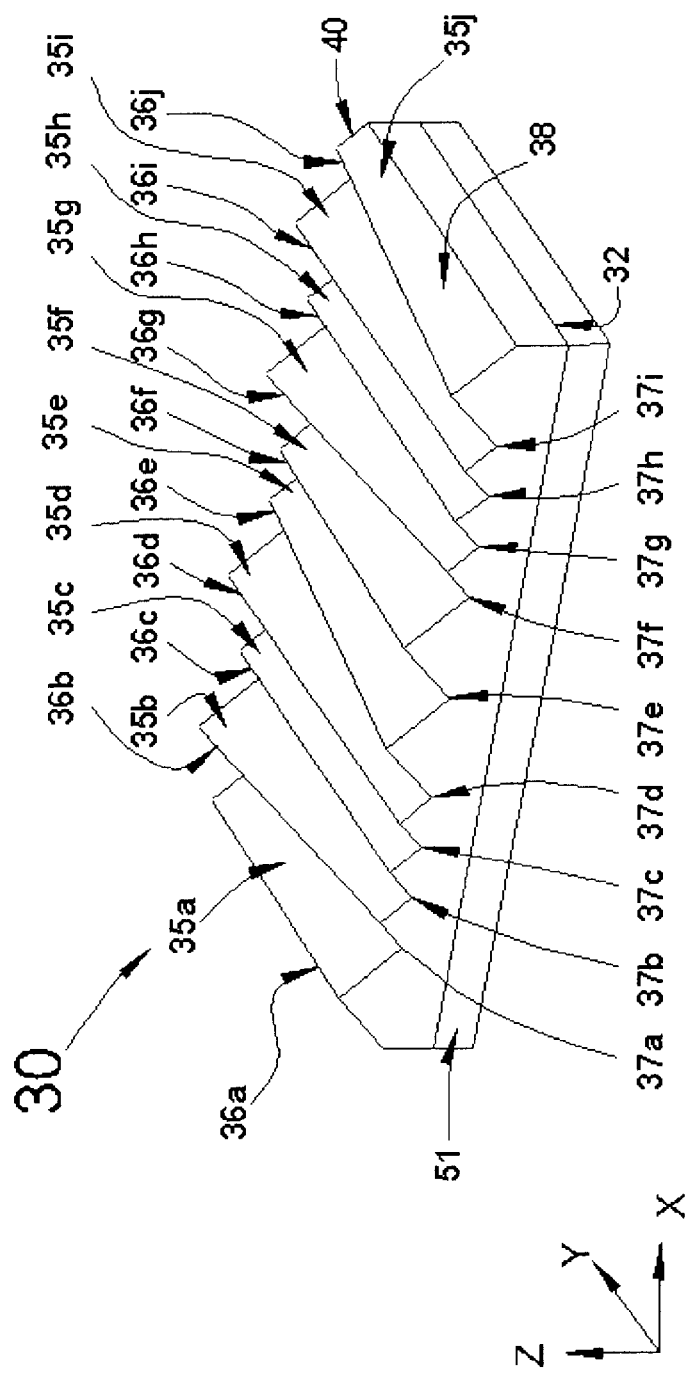
FIG. 2 is a schematic perspective view of the structured light output surface of an optical substrate, in accordance with one embodiment of the present invention.

In one embodiment of the present invention, the light output surface and the light input surface are generally parallel to each other in the overall optical substrate structure (i.e., do not form an overall substrate structure that is generally tapered like a light guide plate in a backlight module, or that is concave or convex). Referring to FIG. 2, the optical substrate 30 has a light input surface 32 that is planar and smooth, and a light output surface 34 that has an irregular prismatic structure that may be viewed as comprising longitudinal irregular prism blocks arranged in lateral rows (i.e., side-by-side).

For ease of reference, the following orthogonal x, y, z coordinate system would be adopted in explaining the various directions. As shown in FIG. 2, the x-axis is in the direction across the peaks and valleys, also referred to as the lateral direction. References to the longitudinal direction of a prism block would be in reference to the peak 36 in a top plan view of the prism block 35. The y-axis is orthogonal to the x-axis, in a generally longitudinal direction of the prism blocks 35. The prism blocks 35 being irregular in geometry, the y-direction may not necessarily lie in the longitudinal direction or along the peaks when viewed in plan view (see for example, FIG. 3). The light input surface 32 lies in an x-y plane. For a rectangular piece of the optical substrate, the x and y-axes would be along the orthogonal edges of the substrate. The z-axis is orthogonal to the x and y-axes. The edge showing the ends of the lateral rows of the prism blocks lies in the x-z plane, such as shown in FIG. 2. References to cross sections of a prism block 35 would be sections taken in x-z planes, at various locations along the y axis. Further, references to a horizontal direction would be in an x-y plane, and references to a vertical direction would be in the z-direction.

Figure 4:
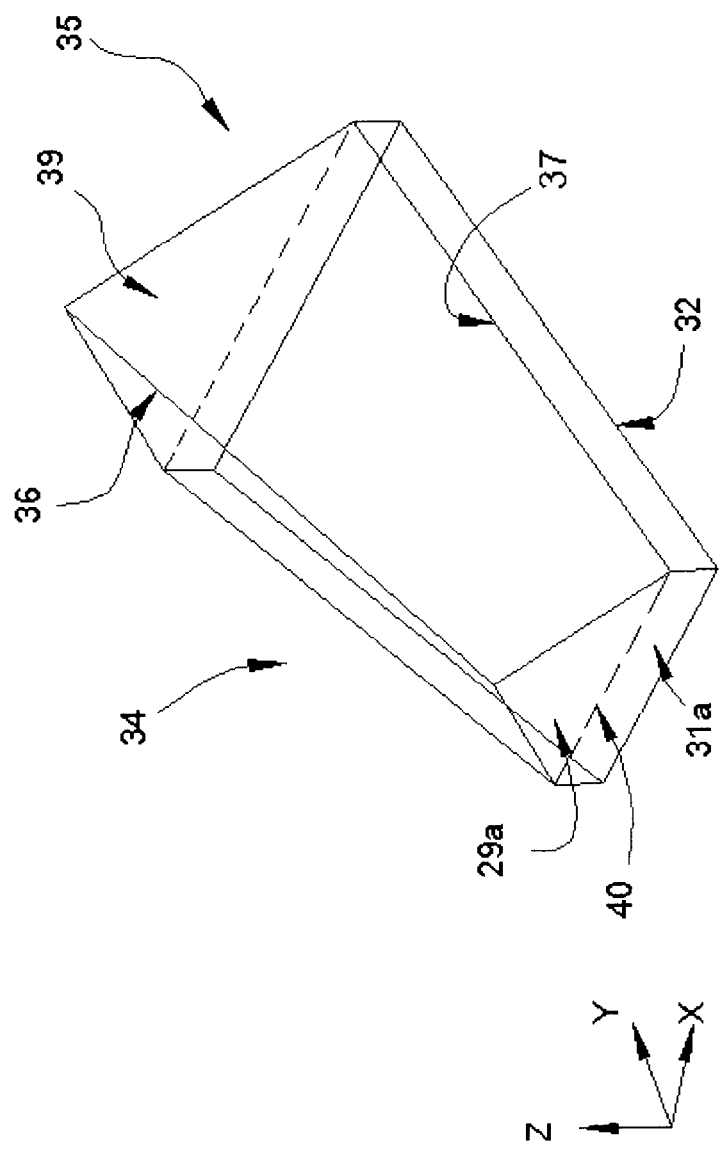
FIG. 4 is a schematic perspective view of an irregular prism block that may be viewed as a building block for structured light output surface of the optical substrate, in accordance with one embodiment of the present invention.

FIG. 4 illustrates a single longitudinal, irregular, prism block 35. The prism block 35 may be viewed as a building block for the optical substrate in accordance with one embodiment of the present invention. It is noted that, as will be apparent in the discussion herein below, the prism blocks are connected to adjoining prism blocks in longitudinal and/or lateral directions. Because the prism blocks are not in fact individual discrete blocks assembled together, the material of the prism blocks are in a continuum or continuous monolithic structure, with no physical contact or joining surfaces per se. However, for ease of illustrating the present invention, the structured surfaces of the optical substrate may be viewed as being made up of a plurality of prism blocks. Nonetheless, the outline of the faceted structure of the prism blocks would be apparent from the structured surface. The end faces of a prism block or the valleys would be defined by transitions (schematically shown in the figures as lines of transitions) between the longitudinally adjoining prism blocks. As will be further noted below, the transition between facets within a prism block (e.g., at the peak) and between facets between prism blocks may be radiused or rounded, but such transition can nonetheless be determined from the change is orientations of the facets.

Using the end 40 in FIG. 4 as a reference, the cross-section of the prism block 35 in FIG. 4 is generally triangular, with a thin layer of substrate or rectangular base 31 $a$ below a triangle 29$a$ (i.e., the base of the triangle extends downward). It is noted that the base 31$a$ and triangle 29$a$ are part of an integral or monolithic structure. The prism block 35 includes a large end 39 and a small end 40, and a peak 36 sloping in a straight line from the large end 39 to the small end 40. The faces at the ends 39 and 40 of the prism blocks are parallel in the embodiment of FIGS. 2 and 3, with the peaks 36 skewed at an angle to the end faces (as viewed from above in a plan view). (For other embodiments discussed below, the end faces of the prism block may be parallel, with the peak 36 perpendicular to at least one of the ends or skewed at an angle to at least one of the end faces, or the faces may be non-parallel. See FIG. 15 for examples of the geometry of the end faces of an irregular prism, and the peak in relation to the end faces.) On each lateral side of the peak 36 is a flat facet 38 of the prism block. The vertex angle of the peak 36, viewed in an x-z sectional plane along different sections of the entire length of the prism block 35, remains constant (e.g., at an angle chosen at between 70 to 110 degrees, preferably at 90 degrees). This will become more apparent when the peak vertex angles are discussed in reference to the optical substrate 30 in FIG. 2, for example. It is noted that the references to vertex angles herein refer to the angles of the peak 36, as viewed along cross sections in the x-z planes at locations along the y direction, as defined above. While FIG. 4 shows the base 31$a$ to be of uniform thickness, it may be non-uniform thickness, as the height of the valleys 37 (in the z-direction) may vary along the longitudinal direction as well as the lateral direction of the respective valleys 37, as further explained below. Hereinafter, references to heights of peaks and valleys are measured in the z-direction with respect to the planar light input surface 32. It is noted that in the sectional views in x-z planes, the vertex angle of the peak 36 and the angle at the bottom of the valley 37 (hereinafter referred to as the valley vertex angle) may be rounded instead of a sharp point, due to manufacturing constraints.

Specifically, a plurality of the longitudinal prism blocks 35 are arranged in lateral rows as shown in FIG. 2. The vertex angles of the peaks 36 may vary as viewed in the sectional plane perpendicular to both x-y plane and prism longitudinal direction, but remains constant for the x-z sectional views at different y locations along a prism block (see, for example, parallel sections A-A, B-B, C-C, D-D in FIG. 3). The vertex angle of the peaks 36 is determined, directly or indirectly, by the angle of the tool used to machine the peaks 36 for the mold used to form the peaks, depending on the process used. For example, the tool may be supported by a stage to translate in various degrees of freedom, including the x, y and z directions, thus resulting in three-dimensionally varying irregular prism blocks of the structured surface of the optical substrate 30, which maintain a constant peak vertex angle in x-z planes at various locations along the y direction. More complex support apparatuses may be used to provide additional degrees of freedom about the motions in x, y and z directions and the rotations of x, y and z axes to result in prism blocks having more complex three-dimensional varying structures.

Figure 3:
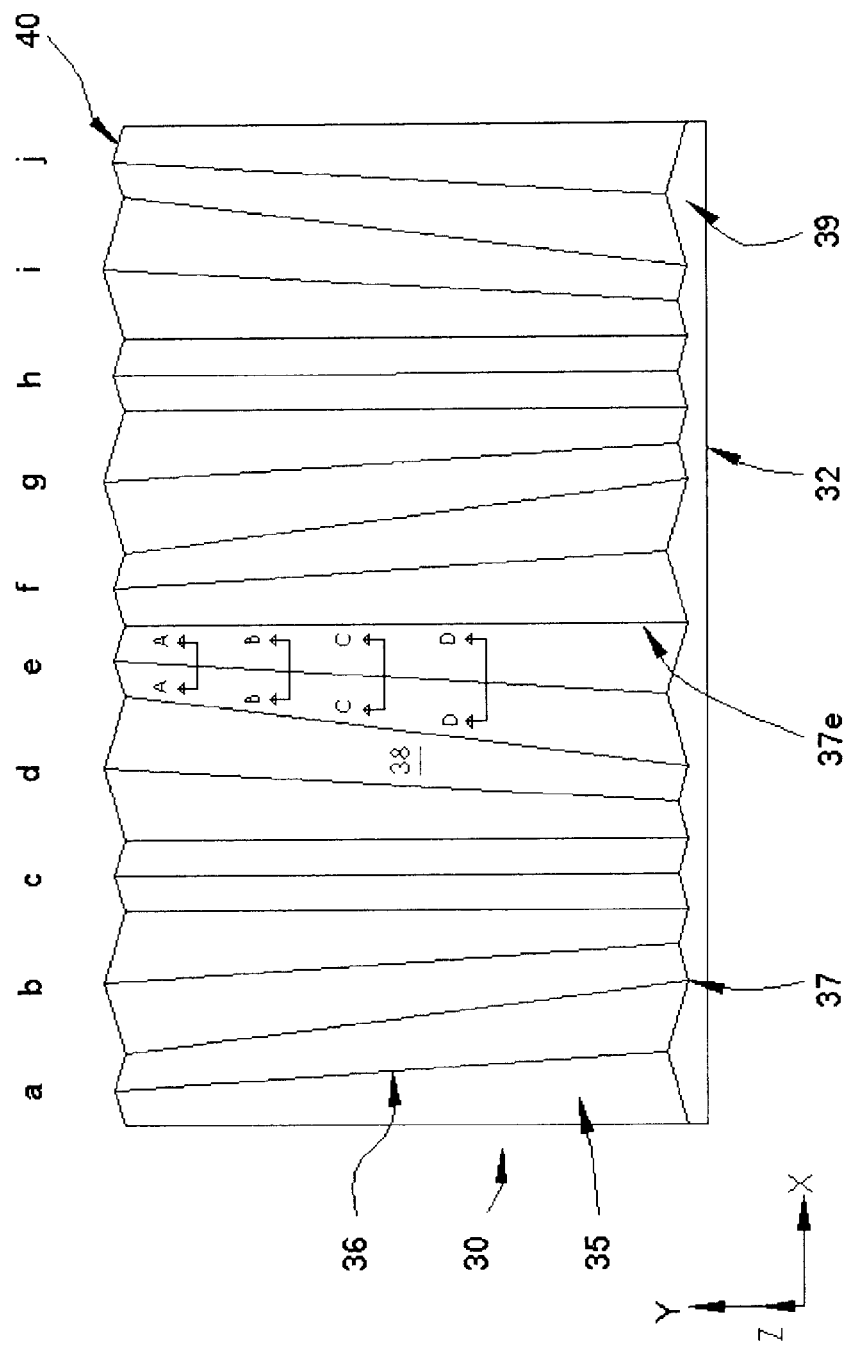
FIG. 3 is a top plan view of the structured light output surface in FIG. 2.

The facets 38 of adjoining prism blocks 35 intersect to define a valley 37. The vertex angles of the valleys 37 may or may not vary across laterally adjoining rows. The prism blocks each may be asymmetrical about x-y, x-z and/or y-z planes within a prism block, or may be symmetrical about some of the planes (e.g., in FIG. 3, the prism block 35c and 35h are symmetrical about a vertical y-z plane through the peaks 36c and 36h, respectively). The combinations of prism blocks 35 may be asymmetrical across the entire plan area of the optical substrate 30, or may be symmetrical along some planes (e.g., the left half section of the optical substrate 30 shown in FIG. 3 is symmetrical to the right half section about a y-z plane through the valley 37e between prism blocks 35e and 35f). It is noted that the geometries (e.g., overall size, angle of the large and small ends to the peak 36, heights of peaks and valleys, etc.) may be different for different prism blocks 35 in the optical substrate 30.

As shown in FIG. 2, the irregular prism structured light output surface 34 comprises longitudinal irregular prism blocks 35a to 35j, arranged in lateral rows (i.e., side-by-side), defining peaks 36a to 36j and valleys 37a to 37i. As more clearly shown in the top plan view of the optical substrate 30 illustrated in FIG. 3, the longitudinally varying prismatic structure has the following structural characteristics in addition to those already noted above. At least a plurality of the irregular prism blocks each has a large end 39 (having a larger width and peak height) tapering to a small end 40 (having a smaller width and peak height). See, for example, prism blocks 35a, 35b, 35d, 35e, 35f, 35g, 35i and 35j. Referring to FIG. 2, at least some of the peaks 36 do not lie in the same horizontal x-y plane within the optical substrate 30, and at least some of the valleys 37a to 37i lie in the same x-y plane within the optical substrate 30 (i.e., the height of the valleys, or the thickness of the base material between the valleys 37a to 37i and the light input surface 32 is constant for some of the valleys). Alternatively, not shown, at least some of the valleys 37a to 37i do not lie in the same x-y plane. Further, the height of the valley 37 (i.e., the thickness between the valley and the light input surface 32) may vary along a valley 37. Further, along opposing edges of the optical substrate 30 in the x-direction, at least within a range of laterally arranged irregular prism blocks, the large ends 39 are mixed with small ends 40 in a random, quasi-random, orderly or semi-orderly fashion (e.g., alternating between larger widths to narrower widths, or from larger peak heights to smaller peak heights). The transitions between laterally adjoining prism blocks (i.e., the valleys 37) are continuous (i.e., no steps), even though the transitions are between flat facets 38. Alternatively, the transitions between laterally adjoining prism blocks may be smoothened or rounded, by providing a radius (not shown) at the transitions or connecting points between adjoining prism blocks. Such radius in the rounding may result from manufacturing constraints, but the bulk of the structured surface features have well defined flat facet faces, except perhaps at the transition points between adjoining prism blocks and/or along the peaks.

Figure 10:
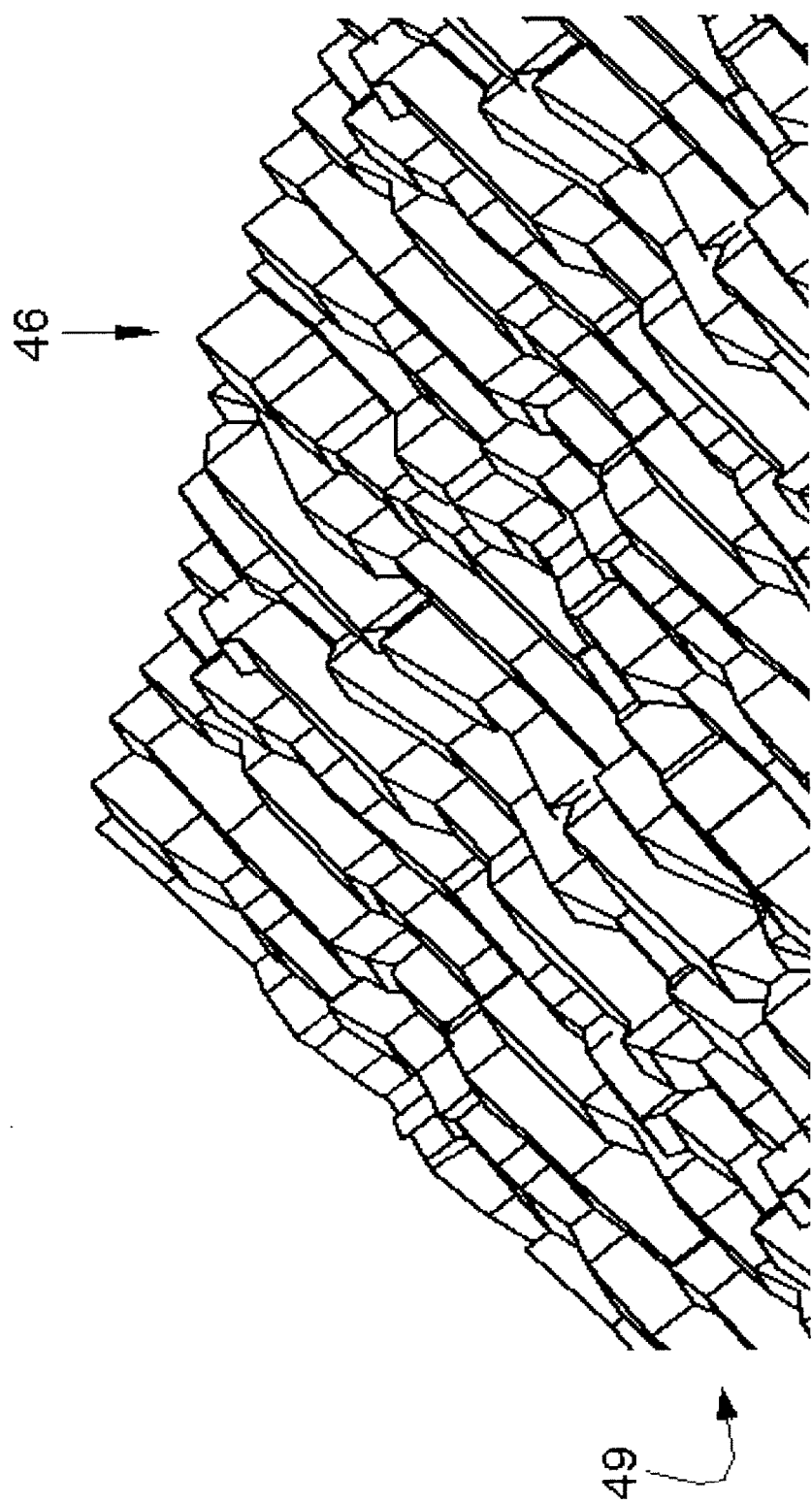
FIG. 10 is a schematic perspective view of the structured light output surface of an optical substrate, in accordance with yet another embodiment of the present invention.

The pitch between adjacent peaks 36, adjacent valleys 37, and/or adjacent peak 36 and valley 37 vary in an orderly, semi-orderly, random, or quasi-random manner. It is noted that an array, pattern or configuration of a group of random irregular prism blocks may repeat over a range of area or length over the overall structured light output surface of the optical substrate 30, resulting in an overall orderly, semi-orderly or quasi-random pattern or arrangement for the overall optical substrate, as illustrated in FIG. 10, and discussed below. Adjacent peaks, adjacent valleys, and/or adjacent peak and valley are not parallel within at least a range of lateral prism blocks. The adjacent peaks 36, adjacent valleys 37, and/or adjacent peak 36 and valley 37 may alternate from parallel to non-parallel, in an orderly, semi-orderly, random, or quasi-random manner. Similarly, adjacent non-parallel peaks 36, adjacent valleys 37 and/or adjacent peak 36 and valley 37, may alternate between convergence to divergence (in reference to the same general longitudinal direction of the prism blocks), in an orderly, semi-orderly, random, or pseudo-random manner. The large ends 39, and/or the small ends 40, may be the same size and shape, but may be different without departing from the scope and spirit of the present invention. Sections of the optical substrate 30 taken across the peaks 36 and valleys 37 in an x-z plane at various locations along the y-direction and/or in a general longitudinal direction of a particular peak or valley are not constant. In the embodiment illustrated in FIGS. 2 and 3, there are several longitudinal prism blocks 35c and 35h that may be of uniform width, ends and or peaks and valleys along their longitudinal direction. Even though these particular individual prism blocks have regular geometries, they nonetheless contribute to the irregularity of the structured surface taken as a whole, with reference to other prism blocks.

Figure 15:
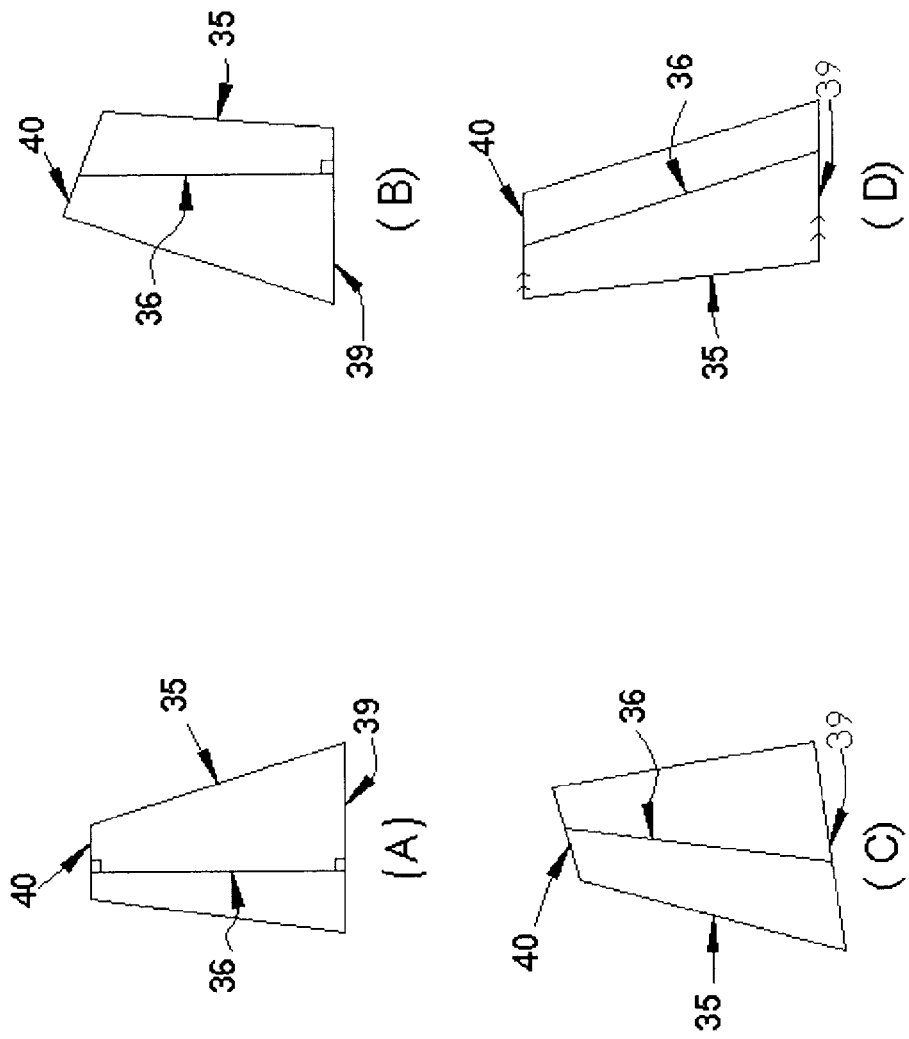
FIG. 15 schematically illustrates top plan view of various configurations of end faces in relation to the peak of the prism block.

In another embodiment of the present invention, the irregular prism structure at the light output surface may be viewed as comprising side-by-side or lateral rows of irregular prismatic structures, wherein each longitudinal row of irregular prismatic structure may be viewed as comprising a plurality of irregular prism blocks that intersect or are connected end to end in a continuous manner. In one embodiment illustrated in FIG. 5, at the light output surface 43, the smaller end of one prism block is connected to the smaller end of another prism block along the same row, and the larger end of one prism block is connected to the larger end of another prism block along the same row within the optical substrate 31. FIG. 6 illustrates two longitudinal prism blocks 35m and 35n, each similar to the prism block 35 in FIG. 4, which are connected end-to-end at the small ends of both prism blocks. The surfaces at both ends of one or more of the longitudinal prism blocks may be parallel, with the peaks perpendicular to the end faces or skewed laterally at an angle to the end surfaces, as viewed from the top of the structured surface of the film 31, or the end surfaces may be non-parallel. (It is noted that the end faces of the prism blocks may or may not lie in an x-z plane in reference to the optical substrate 31 in FIG. 5.) FIG. 15 shows top views of examples of various irregular prisms, in particular the relation of the end faces 39 and 40 to the peak 36 and the longitudinally tapering sides of the respective prisms. Specifically, the prism block 35 in A has parallel end faces 39 and 40, and the peak 36 is perpendicular to both the end faces; the prism block 35 in B has non-parallel end faces 39 and 40, and the peak 36 is perpendicular to the end face 39 only; the prism block 35 in C has non-parallel end faces 39 and 40, and the peak 36 is not perpendicular to any end face; and the prism block 35 in D has parallel end faces 39 and 40, and the peak 36 is not perpendicular to any end face.

Figure 5:
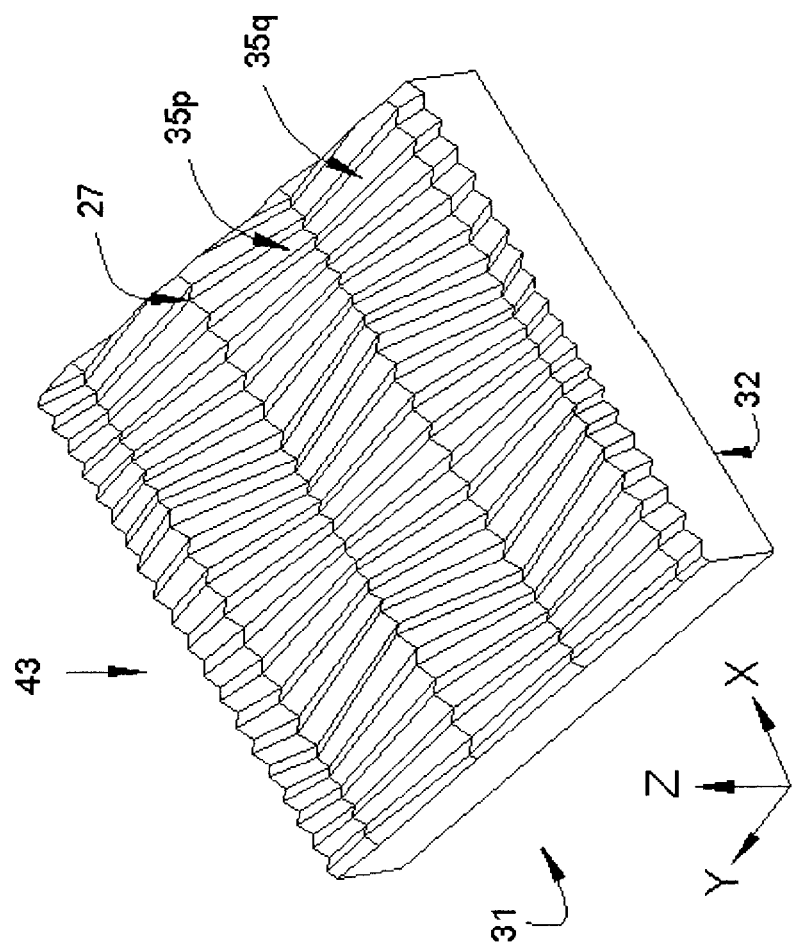
FIG. 5 is a schematic perspective view of the structured light output surface of an optical substrate, in accordance with another embodiment of the present invention.
Figure 6:
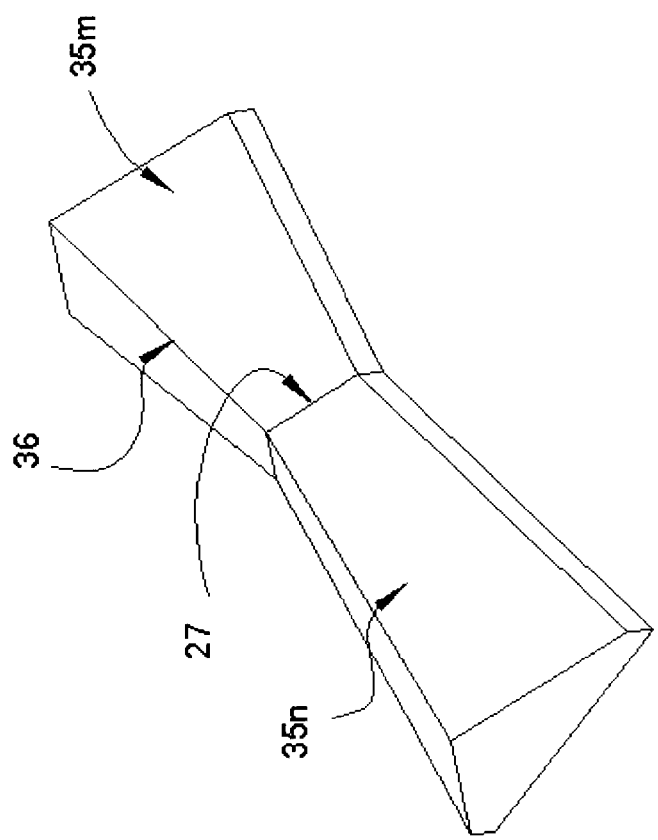
FIG. 6 is a schematic perspective view of a plurality of irregular prism blocks aligned in a row, in accordance with one embodiment of the present invention.

The longitudinal prism blocks may also be intersected or connected end-to-end at their large ends, as can be seen in FIG. 5 (e.g., 35*p* and 35*q*). The transitions 27 between longitudinally adjoining prism blocks may be smoothened or rounded, by providing a radius (not shown) at the transitions or connecting points between adjoining prism blocks. The irregular prism blocks 35 in a particular row may have different or similar size and geometry (e.g., different lengths, angles of taper, end surface sizes, etc). For example, instead of alternating between irregular prism blocks of generally similar lengths in a row as shown in FIG. 5, irregular prism blocks of different geometries and sizes may be connected in a row in a orderly, semi-orderly, random or quasi-random mix, to form the structured light output surface 45 illustrated in FIGS. 7 and 8 (as will be discussed below, the film 41 shown in FIGS. 7 and 8 may include also regular prism blocks in a further embodiment). For example, one end of a first irregular prism block 35*r* may be connected to one end of a second irregular prism block 35*s* of a different length. A plurality of the rows of irregular prism blocks are arranged side-by-side or laterally, to form the optical substrate 41.

The transitions 27 between longitudinally adjoining prism blocks in a row and the transitions between rows (i.e., valleys 37) are continuous with no steps between adjoining prism blocks, even though such transitions are between flat facet surfaces (both in a row and between rows). The transitions of the straight peaks of the longitudinally adjoining prism blocks in the same row are also continuous without any step. Such transitions may be smoothened or rounded by providing a curvature at the transitions, but the bulk of the structured surfaces of the prism blocks would be flat facets. In other words, the transitions are rounded to some extent. The curvature of such rounding may be the result of manufacturing constraints depending on the use a particular tool and the movement of such tool across the substrate to form the structured surface. Generally, the length of the curvature section (viewed in the plane in which the curvature lies) is significantly smaller when compared to the characteristic dimension (length and/or width) of the flat facets of the prism blocks (e.g., for purpose of illustrating the relative extent of the rounding to the facets, the curvature may be on the order of less than 15%, preferably less than 10%, and more preferably less than 5% of the characteristic dimension of the flat facet section.)

FIG. 9A shows an alternate embodiment of the intersection or connection of prism blocks in a row. The row of prism blocks includes longitudinal irregular prism blocks 35 (similar to FIG. 4), and regular prism blocks 33 of various sizes (e.g., irregular prism blocks 35*t* and 35*u*, and regular prism block 33*a* and 33*b*), depending on the size of the adjoining ends of the irregular prism blocks 35. FIG. 9A shows an example of two irregular prism blocks 35 and regular prism blocks 33 arranged in a row. More prism blocks 33 and 35 may be provided in the row. The irregular prism blocks 35 and the regular prism blocks 33 in a particular row respectively may have different sizes and/or geometries, or similar size and/or geometry (e.g., different lengths of the irregular prism blocks 35 and/or regular prism blocks 33, angles of taper of the irregular prism blocks 35, end surface sizes of the irregular prism blocks 35 and regular prism blocks 33, etc.). Further, instead of alternating between a regular prism block 33 and an irregular prism block 35 in a row, regular prism blocks 33 and irregular prism blocks may be connected in a row in any or random mix. For example, one end of a first irregular prism block 35 may be connected to one end of a second irregular prism block 35, and the other end of the first prism block may be connected to a regular prism block 33. The surfaces at both ends of one or more of the prism blocks in FIG. 9A may be parallel, with the peaks 36 of the prism blocks perpendicular to the end surfaces or skewed laterally at an angle to the end surfaces, or the end surfaces are non-parallel, as viewed from the top. The transitions 27 are continuous, and may be smoothened or rounded with a curvature, as noted in the earlier embodiment.

FIG. 9B shows an alternate embodiment of FIG. 9A, in which irregular prism blocks 35*w* and 35*x* are intersected with or connected to regular prism blocks 33*c* and 33*d* in an end-to-end fashion, such that the peaks of the prism blocks are skewed at an angle to each other as viewed from the top (e.g., 0. to 45 degrees. In this embodiment, either the end faces of each or both of the irregular prism blocks 35*w* and 35*x* are not parallel, and/or the end faces of each or both of the regular prism blocks 33*c* and 33*d* are not parallel, or in the alternative if the end surfaces are parallel, the peaks of the prism blocks are not perpendicular to its end surface. As in the earlier embodiments, the transitions 27 are continuous, and may be smoothened with a curvature.

A plurality of the rows of irregular and regular prism blocks may be arranged side-by-side or laterally, to form the structured light output surface of an optical substrate. The film 41 shown in FIGS. 7 and 8 may include a mix of irregular and regular prism blocks (i.e., a combination of the building blocks shown in FIG. 6, FIGS. 9A and/or 9B).

Figure 7:
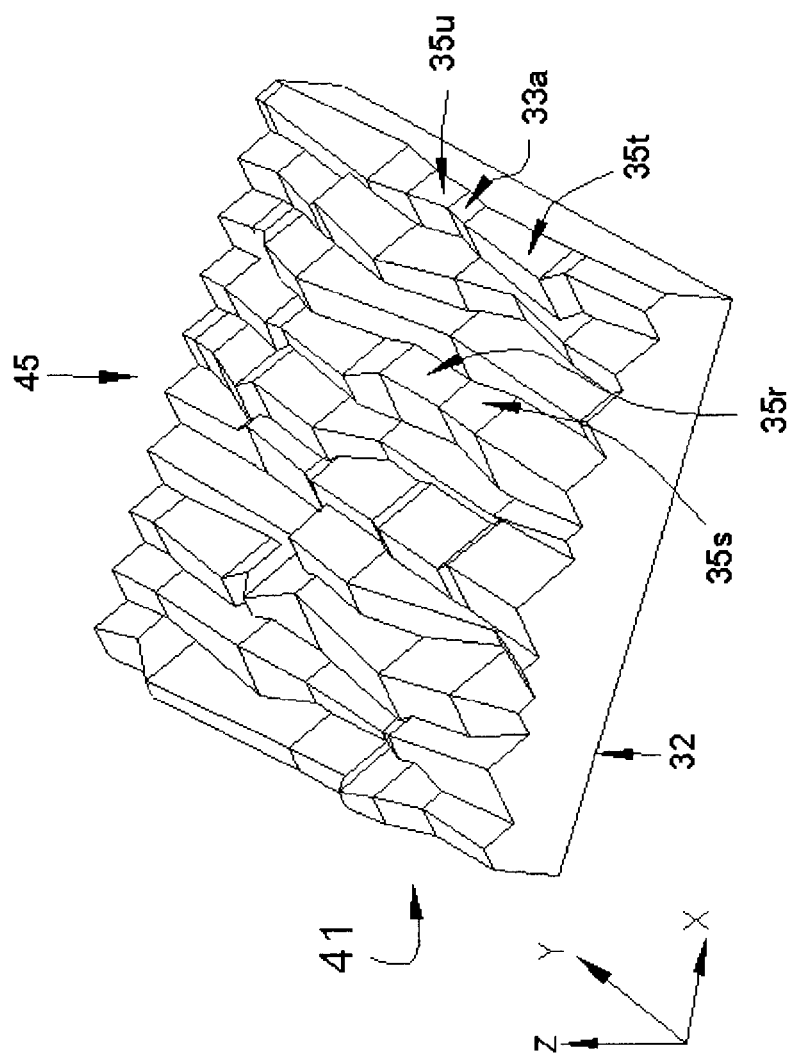
FIG. 7 is a schematic perspective view of the structured light output surface of an optical substrate, in accordance with a further embodiment of the present invention.

The peak and valley structure across the prism blocks in the embodiments of FIG. 7 may have structural characteristics similar to that described earlier with respect to the embodiment of FIG. 2. For example, the top plan view of the peaks and valleys of the prism blocks are not parallel (i.e., in a lateral direction) over a range of laterally and/or longitudinally adjoining prism blocks. However in contrast to the embodiment of FIG. 2, in the embodiments of FIG. 7, most of the valleys do not lie in the same horizontal plane within the film, as the facets of the prism blocks of one row intersect the facets of the prism blocks of another row, with the lines of intersection of the facets (i.e., the valleys) at different heights from the light input surface 32, depending in part on the width of the prism blocks.

FIG. 10 illustrates an embodiment of structured light output surface 46 for an optical substrate 49, in which it is more clearly illustrated that the array of random structured surface features repeats after a certain length or area across the plane of the overall film, thus forming an overall orderly, semi-orderly, or quasi-random irregular prism block structure across the entire structured surface of the optical substrate 49. The characteristic dimension of the repeated array is on the order of every 2 rows to 50 rows, preferably every 2 rows to 35 rows, more preferably every 2 rows to 20 rows, or even more preferably every 2 rows to 10 rows.

Figure 11:
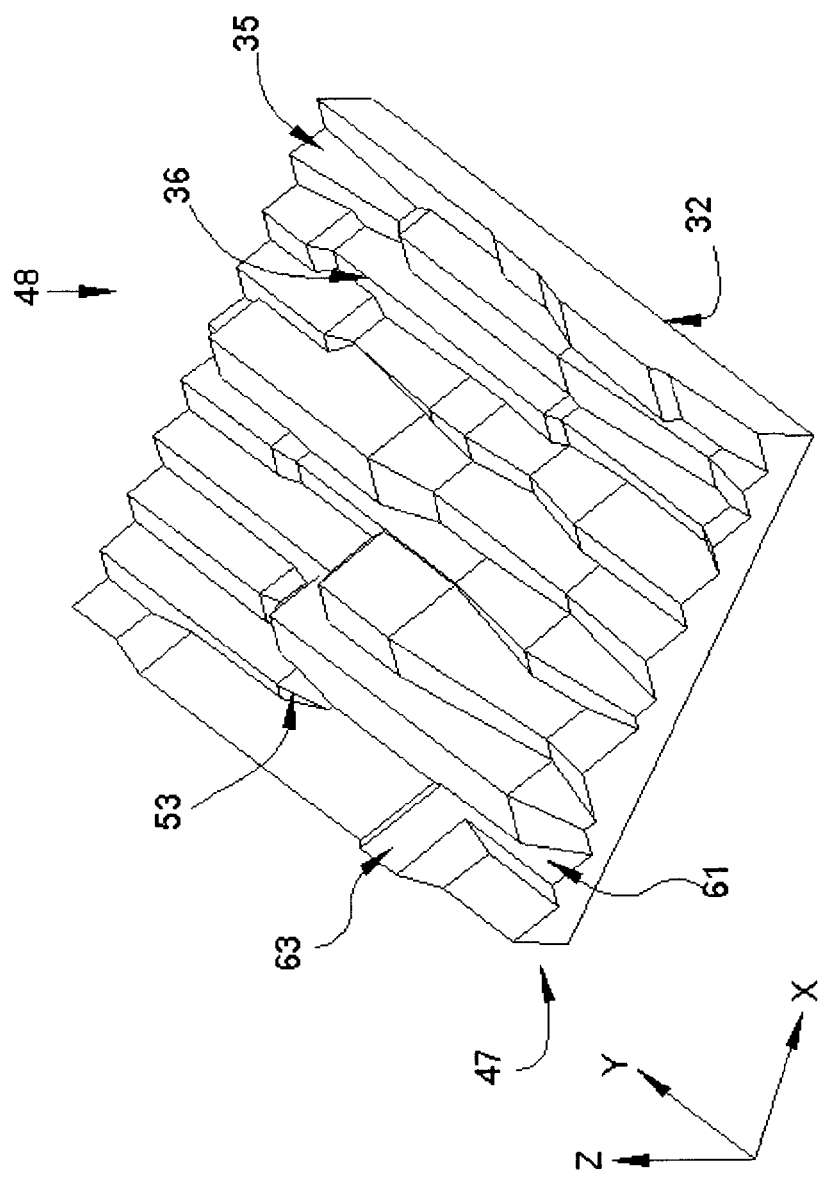
FIG. 11 is a schematic perspective view of the structured light output surface of an optical substrate, in accordance with still a further embodiment of the present invention.
Figure 12:
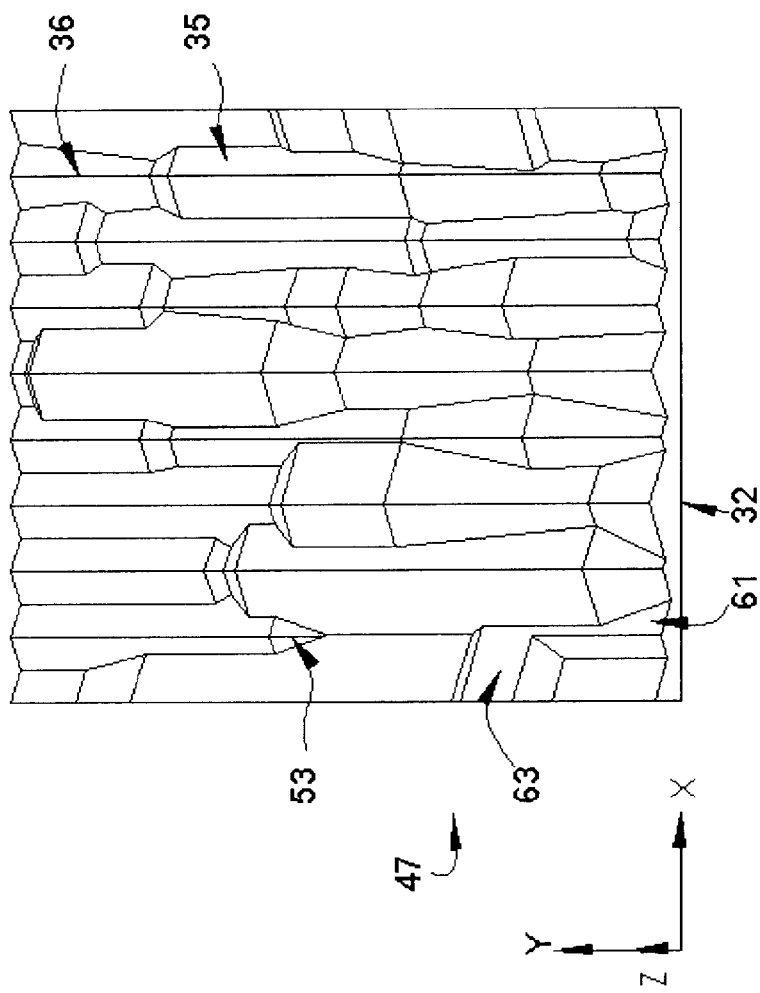
FIG. 12 is a top plan view of the structured light output surface in FIG. 11.

In a further embodiment of the present invention, the peaks of adjacent rows of prism blocks are parallel in the lateral direction in the plane of the optical substrate 47 (i.e., in the top view), as illustrated in FIGS. 11 and 12. The structured light output surface 48 of the optical substrate 47 may be viewed as comprising the block structures shown in FIGS. 6 and 9, but in contrast to the earlier embodiment of FIG. 7, the peaks 36 of the prism blocks in a row is aligned in a straight line, and the adjacent peaks 36 between adjoining rows are parallel in the plane of the film 47, at least over a range of lateral rows. The surfaces at both ends of each prism block are parallel with the peak of the prism block perpendicular to the end surfaces. Similar to the embodiment of FIG. 7, most of the valleys the present embodiment of FIG. 11 do not lie in the same horizontal plane within the film 47, as the facets of the prism blocks of one row intersect the facets of the prism blocks of another row, with the lines of intersection (i.e., the valleys) at different heights from the light input surface 32, depending in part on the width of the prism blocks.

It is noted that in the embodiment of FIGS. 7 and 8 and FIGS. 11 and 12, one prism block 35 intersect another prism block in both the longitudinal and lateral directions. Further, referring to the left side of the optical substrate 47 in FIG. 12, a prism block 53 intersect with adjoining prism blocks in a manner such that it terminates in the longitudinal direction. In this particular example, the peak of the prism block 53 terminates, and the valleys on either side of the prism block 53 meet to run into a single valley in the longitudinal direction. Still further, referring to FIG. 11, adjoining prism blocks may intersect in a manner without a transition at some of the adjoining facets. For example, referring to FIGS. 11 and 12, at the left corner of the optical substrate 47, the facet 61 of one prism block may continue to the facet 63 of an adjoining prism block without any transition.

Figure 13:
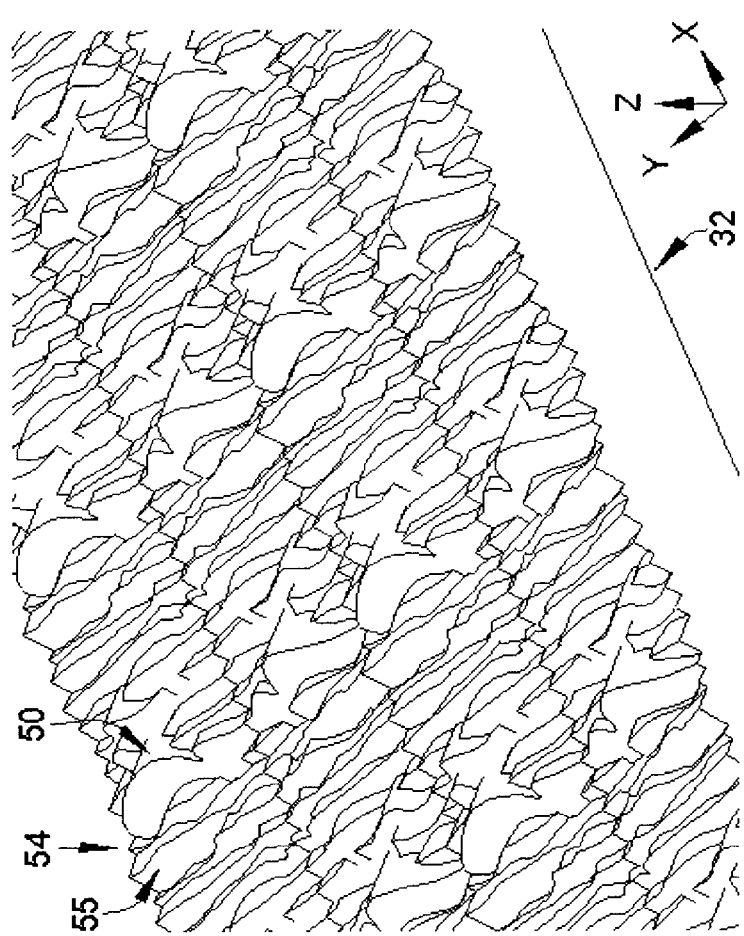
FIG. 13 is a schematic perspective view of the structured light output surface of an optical substrate, in accordance with yet a further embodiment of the present invention.
Figure 14:
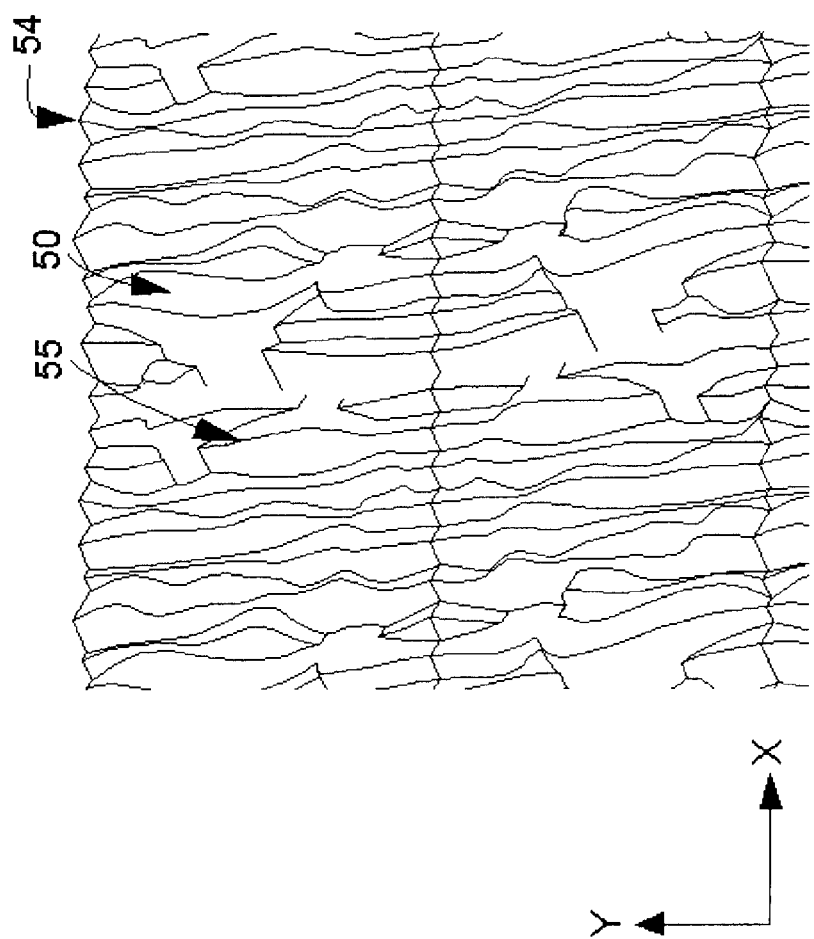
FIG. 14 is a top plan view of the structured light output surface in FIG. 13.

In yet another embodiment of the present invention, one or more facets 50 and/or peaks 55 of one or more prism blocks may be substantially curved (convex and/or concave), as shown in the structured surface 54 in FIGS. 13 and 14. The peaks 55 may follow wavy lines, and the facets 50 may or may not have wavy surfaces, including both concave and convex surfaces. The vertex angle of the peak 55 of a wavy prism block may or may not have a constant angle at x-z plane sectional views along the y-direction. It is noted that on either side of a peak 55, other than making both facets curved, one facet may be curved and the other facet may be flat. Different peaks 55 follow different curves, which may include a section of only one curvature, or many sections having different curvatures in a random, quasi-random, orderly or semi-orderly manner along a particular peak. As is clear from FIGS. 13 and 14, adjoining prism blocks across the structured surface 54 may have different curved or wavy peaks and/or facet surfaces, having curvatures differing in a random, quasi-random, orderly or semi-orderly manner.

These additional embodiments may share further features and characteristics of the structured surfaces that are similar to the earlier described embodiments.

In accordance with the present invention, the optical substrate comprising an irregular, prismatic, structured light output surface, which enhances brightness and reduces moire patterns, when applied in an LCD for example. While various embodiments of structured light output surfaces have been described above independently, it can be appreciated that the various embodiments may be combined in a single optical substrate, without departing from the scope and spirit of the present invention.

As an example to illustrate the relative dimensions of an optical substrate in accordance with the present invention, the peak height at different x-y locations may vary from as small as on the order of 1 to 10 μm, to as large as on the order of 100 to 200 μm. The relative peak height difference (along a particular peak and/or between lateral peaks) may vary on the order of 1 to 100 μm, the relative height difference between valleys may also vary on the order of 1 to 100 μm, the relative width difference between peaks may vary on the order of 2 to 200 μm. The length of the prism block may vary on the order of 100 μm to 500 mm. The foregoing dimensions are intended to illustrate the fact that the structured surface features are microstructures, in the μm range. By way of example, the overall size of the area of the optical substrate may vary on the order of 2 mm to 10 m in width and length (and even larger dimensions possible), depending on the particular application (e.g., in a flat panel display of a cellular phone, or in a significantly larger flat panel display of a TV monitor). The characteristic size of the prism blocks on the structured surface of the optical substrate need not change appreciably with different overall optical substrate size. The optical substrates discussed in connection with the various embodiments discuss above may be supported by a base substrate, such as base substrate 51 shown in FIG. 2. The optical substrates may be formed with an optically transparent material. The base substrate 51, which may be made from the same transparent material as the optical substrate 30, provides additional structural support to the relatively thin optical substrate 30, for example. The optical substrate 30 may be flexible enough to be manufactured in a roll, which is laid on and bonded to the separate base substrate 51. Alternatively, the base substrate 51 may be an integral part of the monolithic structure of the optical substrate 30. The thickness of the base substrate may be on the order of 25 to 300 μm thick. The thickness of the base substrate may be thinner or thicker than this range, depending on the particular application. Generally, though not required, larger size optical substrate may have a thicker base substrate to provide better support, and a smaller size optical substrate may require a thinner base substrate for smaller scale applications.

The structured surface of optical substrate of the present invention may be generated in accordance with a number of process techniques, including micromachining using hard tools to form molds or the like for the irregular prismatic profile described above. The hard tools may be very small diamond tools mounted on CNC (Computer Numeric Control) machines (e.g. turning, milling and ruling/shaping machines). Preferably these machines may add some vibration devices to assist the tools moving with small shifts and making prisms with different level of irregularity. Known STS (Slow Tool Server), FTS (Fast Tool Server) and some ultrasonic vibration apparatus are examples of the devices. U.S. Pat. No. 6,581,286, for instance, discloses one of the applications of the FTS for making grooves on an optical film by using thread cutting method. The tool is mounted onto the machine, to create constant peak vertex angle in relation to x-z planes along the y direction within a prism. By using the devices to form surfaces in the mold in relation to increasing degrees of freedom, three-dimensionally varying irregular prism blocks of the structured surfaces of the optical substrates disclosed above can be obtained.

The master may be used to mold the optical substrate directly or used in electroforming a duplicate of the master, which duplicate is used to mold the optical substrate. The mold may be in the form of a belt, a drum, a plate, or a cavity. The mold may be used to form the prismatic structure on a substrate through hot embossing of the substrate, and/or through the addition of an ultraviolet curing or thermal setting materials in which the structures are formed. The mold may be used to form the optical substrate through injection molding. The substrate or coating material may be any organic, inorganic or hybrid optically transparent material and may include suspended diffusion, birefringent or index of refraction modifying particles.

Figure 16:
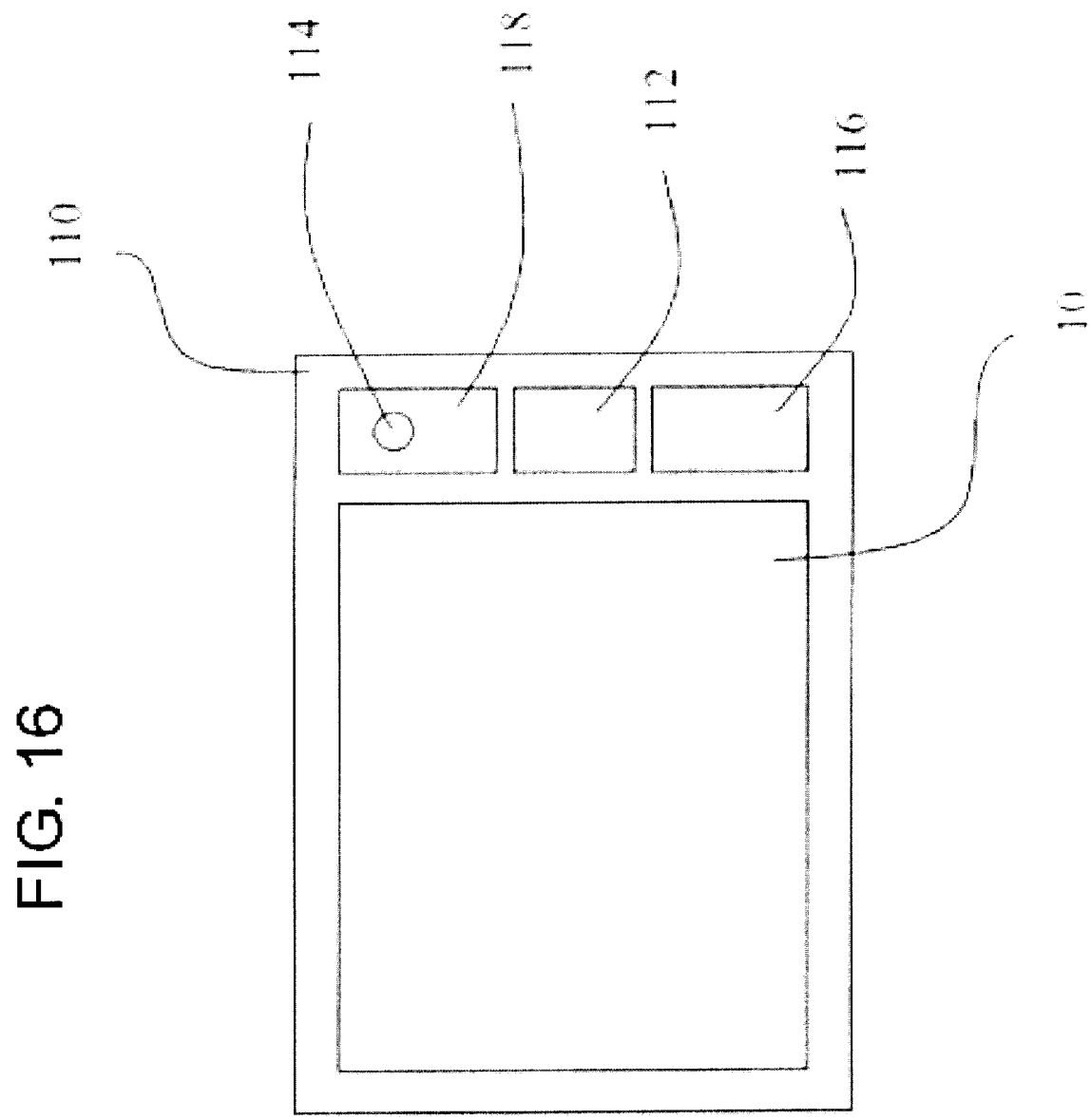
FIG. 16 is a schematic view of an electronic device comprising an LCD panel that incorporates the inventive optical substrate of the present invention, in accordance with one embodiment of the present invention.

An LCD incorporating the inventive optical substrate in accordance with the present invention may be deployed in an electronic device. As shown in FIG. 16, an electronic 110 (which may be one of a PDA, mobile phone, television, display monitor, portable computer, refrigerator, etc.) comprises the inventive LCD 10 (FIG. 1) in accordance with one embodiment of the present invention. The LCD 10 comprises the inventive optical substrate described above. The electronic device 110 may further include within a suitable housing, a user input interface such as keys and buttons (schematically represented by the block 116), image data control electronics, such as a controller (schematically represented by block 112) for managing image data flow to the LCD panel 10, electronics specific to the electronic device 110, which may include a processor, A/D converters, memory devices, data storage devices, etc. (schematically collectively represented by block 118), and a power source such as a power supply, battery or jack for external power source (schematically represented by block 114), which components are well known in the art.

While particular embodiments of the invention have been described herein for the purpose of illustrating the invention and not for the purpose of limiting the same, it will be appreciated by those of ordinary skill in the art that numerous variations of the details, materials, and arrangements of parts may be made without departing from the scope of the invention as defined in the appended claims.

What is claimed is:

1. A light directing film comprising a first structured major surface, a second major surface opposite to the first structured major surface and a reference horizontal plane between the first structured major surface and the second major surface, wherein the reference horizontal plane is substantially perpendicular to the thickness direction of the light directing film, wherein the first structured major surface comprises a plurality of prisms each of which has a pair of faces intersecting to form a ridge extending substantially along a first direction, and the plurality of prisms are disposed along a second direction substantially perpendicular to the first direction, wherein the plurality of prisms comprises a first prism having a constant vertex angle throughout the entire first prism, wherein the ridge of the first prism comprises a first portion and a second portion, wherein the first portion has a constant height relative to the reference horizontal plane, and the second portion has a non-constant height relative to the reference horizontal plane and a maximum height relative to the reference horizontal plane, wherein the maximum height is larger than the constant height.

2. The light directing film according to claim 1, wherein the second major surface defines the light input surface of the light directing film and the first structured major surface defines the light output surface of the light directing film.

3. The light directing film according to claim 1, wherein the height of each point on the entire second portion is not smaller than the constant height of the first portion.

4. The light directing film according to claim 1, wherein each of the plurality of prisms extends continuously along the first direction.

5. The light directing film according to claim 1, wherein the second portion is different from and adjacent to the first portion.

6. The light directing film according to claim 1, wherein each of the plurality of prisms extends continuously and linearly along the first direction.

7. The light directing film according to claim 1, wherein the ridge of each of the plurality of prisms comprises a first portion and a second portion, wherein the second portion is different from and adjacent to the first portion.

8. A light directing film comprising a first structured major surface, a second major surface opposite to the first structured major surface and a reference horizontal plane between the first structured major surface and the second major surface, wherein the second major surface defines the light input surface of the light directing film and the first structured major surface defines the light output surface of the light directing film, and the reference horizontal plane is substantially perpendicular to the thickness direction of the light directing film, wherein the first structured major surface comprises a plurality of prisms each of which has a pair of faces intersecting to form a ridge extending substantially along a first direction, each of the plurality of prisms extends continuously along the first direction, and the plurality of prisms are disposed along a second direction substantially perpendicular to the first direction, wherein the plurality of prisms comprises a first prism having a constant vertex angle throughout the entire first prism, wherein the ridge of the first prism comprises a first portion and a second portion, wherein the second portion is different from and adjacent to the first portion, wherein the first portion has a constant height relative to the reference horizontal plane, and the second portion has a non-constant height relative to the reference horizontal plane and a maximum height relative to the reference horizontal plane, wherein the maximum height is larger than the constant height, and the height of each point on the entire second portion is not smaller than the constant height of the first portion.

9. The light directing film according to claim 8, wherein each of the plurality of prisms is a triangular prism and extends continuously from a first edge of the light directing film to a second edge of the light directing film opposite to the first edge of the light directing film.

10. The light directing film according to claim 9, wherein each of the plurality of prisms extends continuously and linearly from a first edge of the light directing film to a second edge of the light directing film opposite to the first edge of the light directing film.

11. The light directing film according to claim 8, wherein the ridge of each of the plurality of prisms comprises a first portion and a second portion, wherein the second portion is different from and adjacent to the first portion.

12. A light directing film comprising a first structured major surface, a second major surface opposite to the first structured major surface and a reference horizontal plane between the first structured major surface and the second major surface, wherein the reference horizontal plane is substantially perpendicular to the thickness direction of the light directing film, wherein the first structured major surface comprises a plurality of prisms each of which has a pair of faces intersecting to form a ridge extending substantially along a first direction, and the plurality of prisms are disposed along a second direction substantially perpendicular to the first direction, wherein the plurality of prisms comprises a first prism, wherein each cross-sectional shape of the entire first prism is a triangle, wherein the ridge of the first prism comprises a first portion and a second portion, wherein the first portion has a constant height relative to the reference horizontal plane, and the second portion has a non-constant height relative to the reference horizontal plane and a maximum height relative to the reference horizontal plane, wherein the maximum height is larger than the constant height.

13. The light directing film according to claim 12, wherein the second major surface defines the light input surface of the light directing film and the first structured major surface defines the light output surface of the light directing film.

14. The light directing film according to claim 12, wherein the height of each point on the entire second portion is not smaller than the constant height of the first portion.

15. The light directing film according to claim 12, wherein each of the plurality of prisms extends continuously along the first direction.

16. The light directing film according to claim 12, wherein the second portion is different from and adjacent to the first portion.

17. The light directing film according to claim 12, wherein each triangle has the same vertex angle.

18. The light directing film according to claim 12, wherein each of the plurality of prisms extends continuously and linearly along the first direction.

19. The light directing film according to claim 12, wherein the second major surface defines the light input surface of the light directing film and the first structured major surface defines the light output surface of the light directing film, wherein each of the plurality of prisms extends continuously from a first edge of the light directing film to a second edge of the light directing film opposite to the first edge of the light directing film, wherein the second portion is different from and adjacent to the first portion, wherein the height of each point on the entire second portion is not smaller than the constant height of the first portion, wherein each triangle has the same vertex angle.

20. The light directing film according to claim 12, wherein the ridge of each of the plurality of prisms comprises a first portion and a second portion, wherein the second portion is different from and adjacent to the first portion.

\* \* \* \* \*